(12) United States Patent
Wei et al.

(10) Patent No.: US 9,479,811 B2
(45) Date of Patent: *Oct. 25, 2016

(54) VIDEO RECOMMENDATION BASED ON VIDEO CO-OCCURRENCE STATISTICS

(71) Applicant: Google Inc., Mountain View, CA (US)

(72) Inventors: Li Wei, Milpitas, CA (US); Kun Zhang, Mountain View, CA (US); Yu He, Sunnyvale, CA (US); Xinmei Cai, Tokyo (JP)

(73) Assignee: Google, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/490,542

(22) Filed: Sep. 18, 2014

(65) Prior Publication Data

US 2015/0012926 A1    Jan. 8, 2015

Related U.S. Application Data

(63) Continuation of application No. 13/325,369, filed on Dec. 14, 2011, now Pat. No. 8,868,481.

(51) Int. Cl.
*G06N 5/00* (2006.01)
*H04N 21/2668* (2011.01)
*G06N 5/04* (2006.01)
*H04N 21/262* (2011.01)
*H04N 21/442* (2011.01)
(Continued)

(52) U.S. Cl.
CPC .... *H04N 21/2668* (2013.01); *G06F 17/30828* (2013.01); *G06N 5/04* (2013.01); *H04N 21/26258* (2013.01); *H04N 21/44222* (2013.01); *H04N 21/4826* (2013.01); *G06N 5/00* (2013.01)

(58) Field of Classification Search
None
See application file for complete search history.

(56) References Cited

U.S. PATENT DOCUMENTS

| 5,884,282 | A | 3/1999 | Robinson |
| 6,266,649 | B1 | 7/2001 | Linden et al. |
| 7,725,829 | B1 * | 5/2010 | Wong .................. G11B 27/105 715/726 |

(Continued)

FOREIGN PATENT DOCUMENTS

| JP | 2004-326451 | 11/2004 |
| JP | 2003-178088 | 6/2007 |

(Continued)

OTHER PUBLICATIONS

PCT International Search Report and Written Opinion for PCT/US2012/062580, Mar. 15, 2013, 10 pages.

(Continued)

*Primary Examiner* — Kakali Chaki
*Assistant Examiner* — Fuming Wu
(74) *Attorney, Agent, or Firm* — Fenwick & West LLP (57) ABSTRACT

A system and method provides video recommendations for a target video in a video sharing environment. The system selects one or more videos that are on one or more video playlists together with the target video. The video co-occurrence data of the target video associates the target video and another video on one or more same video playlists and frequency of the target video and another video on the video playlists is computed. Based on the video co-occurrence data of the target video, one or more co-occurrence videos are selected and ranked based on the video co-occurrence data of the target video. The system selects one or more videos from the co-occurrence videos as video recommendations for the target video.

16 Claims, 5 Drawing Sheets

(51) Int. Cl.
*H04N 21/482* (2011.01)
*G06F 17/30* (2006.01)

(56) References Cited

U.S. PATENT DOCUMENTS

| | | | |
|---|---|---|---|
| 7,734,630 B2 * | 6/2010 | Kato | G06F 17/30029 |
| | | | 707/748 |
| 7,966,632 B1 | 6/2011 | Pan et al. | |
| 8,688,701 B2 * | 4/2014 | Ghosh | G06F 17/30699 |
| | | | 706/54 |
| 8,868,481 B2 * | 10/2014 | Wei | H04N 21/26258 |
| | | | 706/54 |
| 2006/0015193 A1 * | 1/2006 | Kato | G06F 17/30029 |
| | | | 700/2 |
| 2007/0276857 A1 * | 11/2007 | Fujio | G06F 17/30392 |
| 2009/0083260 A1 | 3/2009 | Artom et al. | |
| 2009/0234878 A1 * | 9/2009 | Herz | G06Q 20/383 |
| 2009/0271823 A1 * | 10/2009 | Jung | H04N 5/44543 |
| | | | 725/39 |
| 2010/0070571 A1 * | 3/2010 | Kisel | H04N 21/47202 |
| | | | 709/203 |
| 2010/0094799 A1 * | 4/2010 | Ohashi | G06F 17/30867 |
| | | | 706/54 |
| 2010/0122286 A1 * | 5/2010 | Begeja | G06Q 30/02 |
| | | | 725/34 |
| 2010/0235313 A1 * | 9/2010 | Rea | G06F 17/30265 |
| | | | 706/52 |
| 2011/0029636 A1 * | 2/2011 | Smyth | G06F 17/3089 |
| | | | 709/217 |
| 2011/0093492 A1 * | 4/2011 | Sull | G06F 17/30796 |
| | | | 707/769 |
| 2011/0167061 A1 | 7/2011 | Li et al. | |
| 2012/0325906 A1 * | 12/2012 | Rathus | G06Q 30/02 |
| | | | 235/380 |
| 2013/0151462 A1 * | 6/2013 | Ledlie | G06Q 10/10 |
| | | | 706/54 |
| 2013/0159243 A1 * | 6/2013 | Wei | H04N 21/26258 |
| | | | 706/54 |

FOREIGN PATENT DOCUMENTS

| | | | |
|---|---|---|---|
| JP | 2010-502116 A | 1/2010 | |
| JP | 2010-239571 | 10/2010 | |
| JP | 2011-518449 | 6/2011 | |
| JP | WO 2013089924 A1 * | 6/2013 | ....... H04N 21/26258 |
| KR | 10-2010-0043854 | 4/2010 | |
| KR | 10-2011-0049099 | 5/2011 | |
| KR | 10-2011-0083113 | 7/2011 | |
| WO | WO 2010/028839 | 3/2010 | |

OTHER PUBLICATIONS

United States Office Action for U.S. Appl. No. 13/325,369, Nov. 12, 2013, 9 pages.
Office Action for Korean Patent Application No. KR 10-2014-7019106, Mar. 12, 2015, 13 pages.
Office Action for Canadian Patent Application No. CA 2,858,992, Dec. 15, 2015, 3 pages.
Office Action for Australian Patent Application No. AU 2015200201, Nov. 11, 2015, 3 pages.
Office Action for Japanese Patent Application No. JP 2015-001382, Nov. 30, 2015, 4 pages.
Extended European Search Report for European Patent Application No. EP 12857146.0, Dec. 7, 2015, 8 pages.

* cited by examiner

VIDEO RECOMMENDATION BASED ON VIDEO CO-OCCURRENCE STATISTICS

CROSS-REFERENCE TO RELATED APPLICATIONS

This application is a continuation of co-pending U.S. application Ser. No. 13/325,369 filed Dec. 14, 2011, which is incorporated by reference in its entirety.

BACKGROUND

Described embodiments relate generally to web-based video viewing and specifically to recommending videos based on video co-occurrence statistics in an online video content distribution system.

Networked video viewing provides users with rich opportunities to upload, watch and share videos in fast-growing online video entertainment communities. Video viewing sites such as YOUTUBE allow content providers to upload videos easily as individual videos or groups of videos. Users can easily share videos by mailing links to others, or embedding them on web pages or in blogs. Users can also rate and comment on videos, bringing new social aspects to video viewing.

Videos are typically viewed at a video hosting website such as YOUTUBE. Users browsing the video hosting website can find videos of interest by, for example, searching for videos, browsing video directories, or sorting videos by ratings assigned to the videos. Some video hosting sites allow users to create video playlists, create a video viewing channel associated with a personal account on the hosting website to upload videos, look at comments posted by other viewers, and other video viewing activities. Some video hosting services group related videos together based on some measurement of relatedness among the videos and present the related videos as video recommendations when one of the videos is watched by a viewer. One existing measurement of relatedness is co-visitation (also called "co-watch"). Co-visitation based video recommendation selects videos being watched together frequently by users in an online video sharing environment. However, a video that does not get enough co-watches with other videos does not get recommended. Majority of user uploaded videos fall into this scenario because these videos are only interesting to very limited number of viewers.

SUMMARY

A method, system and computer program product provides video recommendations for a given video in a video-sharing environment.

In one embodiment, the video recommendation system selects one or more videos that are on one or more video playlists together with the given video. The video co-occurrence data of the given video is computed. The co-occurrence data of the given video indicates the frequency of the given video appearing on one or more video playlists with another video. Based on the video co-occurrence data of the given video, one or more co-occurrence videos are selected and ranked based on the video co-occurrence data of the given video. The system selects one or more videos from the co-occurrence videos as video recommendations for the given video.

Another embodiment includes a method for generating video recommendations for a given video. A further embodiment includes a non-transitory computer-readable medium that stores executable computer program instructions for generating video recommendations in the manner described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

It is to be understood that the Figures and descriptions of the invention have been simplified to illustrate elements that are relevant for a clear understanding of the embodiments of the invention, while eliminating, for the purpose of clarity, many other elements found in a typical web-based video player and method of using the same. Those of ordinary skill in the art may recognize that other elements and/or steps are desirable and/or required in implementing the invention. However, because such elements and steps are well known in the art, and because they do not facilitate a better understanding of the invention, a discussion of such elements and steps is not provided herein. The disclosure herein is directed to all such variations and modifications to such elements and methods known to those skilled in the art.

Figure 1:
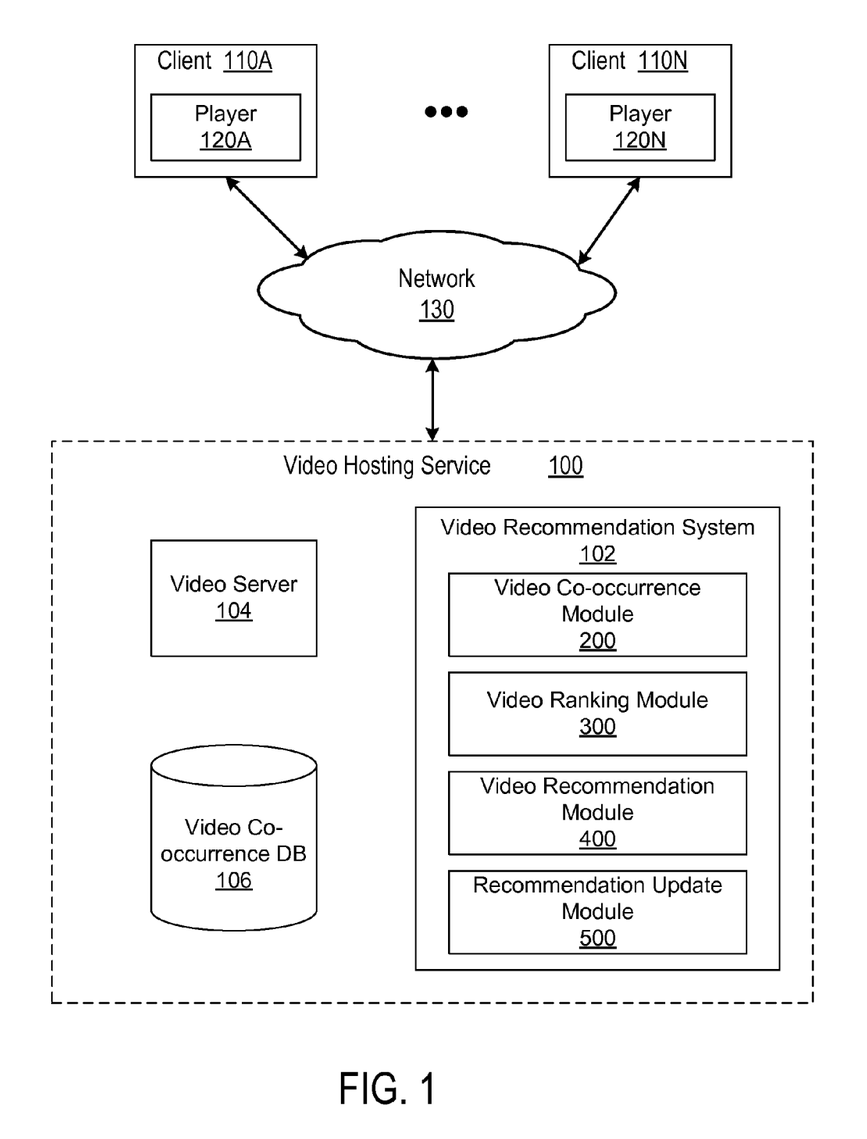
FIG. 1 is a block diagram of a video hosting service having a video co-occurrence based video recommendation system.

FIG. 1 is a block diagram of a video hosting service 100 having a video co-occurrence based video recommendation system 102. Multiple users/viewers use clients 110A-N to send videos to a video hosting service 100 for hosting, and receive various services from the video hosting service 100, including video recommendations. The video hosting service 100 communicates with one or more clients 110A-N via a network 130. The video hosting service 100 can also provide a video recommendation service using the video recommendation system 102, and return the video recommendations to the clients 110A-N.

Turning to the individual entities illustrated on FIG. 1, each client 110 is used by a user to use services provided by the video hosting service 100. For example, a user uses a client 110 to upload videos or groups of videos, to watch a video and receive one or more video recommendations for a video being watched. The client 110 can be any type of computer device, such as a personal computer (e.g., desktop, notebook, laptop) computer, as well as devices such as a mobile telephone or personal digital assistant that has the capability to record video content. The client 110 typically includes a processor, a display device (or output to a display device), a local storage, such as a hard drive or flash memory device, to which the client 110 stores data used by the user in performing tasks, and a network interface for coupling to the video hosting services 100 via the network 130.

A client 110 also has a video player 120 (e.g., the Flash™ player from Adobe Systems, Inc., or a proprietary one) for playing a video stream. The video player 120 may be a standalone application, or a plug-in to another application such as a network browser. Where the client 110 is a general purpose device (e.g., a desktop computer, mobile phone), the player 120 is typically implemented as software executed by the computer. Where the client 110 is dedicated device (e.g., a dedicated video player), the player 120 may be implemented in hardware, or a combination of hardware and software. All of these implementations are functionally equivalent in regards to the embodiments of the invention.

The network 130 enables communications between the clients 110 and the video hosting service 100. In one embodiment, the network 130 is the Internet, and uses standardized internetworking communications technologies and protocols, known now or subsequently developed that enable the clients 110 to communicate with the video hosting service 100. In another embodiment, the network 130 is a cloud computing network and includes one or more components of the video hosting service 100.

The video hosting service 100 comprises a video recommendation system 102, a video server 104 and a video co-occurrence database 106. Other embodiments of the video hosting service 100 may include other and/or different computer modules. The video server 104 stores videos and video playlists created by users or by other sources (e.g., videos recommended by the video recommendation system 102). The video co-occurrence database 106 stores video co-occurrence statistics associated with videos and video playlists stored in the video server 104. The video recommendation system 102 comprises a video co-occurrence module 200, a video ranking module 300, a video recommendation module 400 and a video recommendation update module 500. The video recommendation system 102 analyzes the videos stored in the video server 104 to generate video co-occurrence statistics and use the video co-occurrence statistics to recommend videos to a user for a video selected by the user. In one embodiment, the video recommendation system 102 generates video recommendations for a target video offline (i.e., not in real time). Other embodiments of the video recommendations system 102 can generate video recommendations in real time and/or generate video recommendations in real time using video recommendation data generated offline.

Videos uploaded to the video hosting service 100 can be grouped into lists of videos, each of which has a set of videos and order of the videos to be played. In one embodiment, videos are grouped into a list of videos by a user and the list of videos is uploaded to the video hosting server 100. The list of videos grouped by the user is referred to as a user playlist. For example, a user groups 20 family videos as a list of videos and specifies the order of the videos to be played.

In another embodiment, multiple videos are grouped into a list of videos by an entity of the video hosting service 100 (e.g., the video recommendation system 102). The list of videos grouped by the video recommendation system 102 is referred to as "a system playlist." For example, the video recommendation system 102 groups multiple videos from an artist into a list of videos (e.g., a playlist of Lady Gaga's music videos). A list of videos, whether it is a user playlist of videos or system playlist of videos, has a set of videos and the set of videos are played in an order described in the metadata associated with the list of videos. The metadata of a list of videos may also include other information, e.g., number of videos, identifications of the videos, sources of the videos, tags of the videos and uploading time of the videos in the list.

Video co-occurrence data of a video on a list of videos describes the frequency of the video grouped together with other videos in the same list of videos and in other lists of videos stored in the video server 104. The frequency of a first video grouped together with second video on one or more lists of videos indicates a level of likelihood that a user watching the first video will watch the second video. Two videos grouped together on a video playlist are also referred to as "co-occurrence videos."

Figure 3:
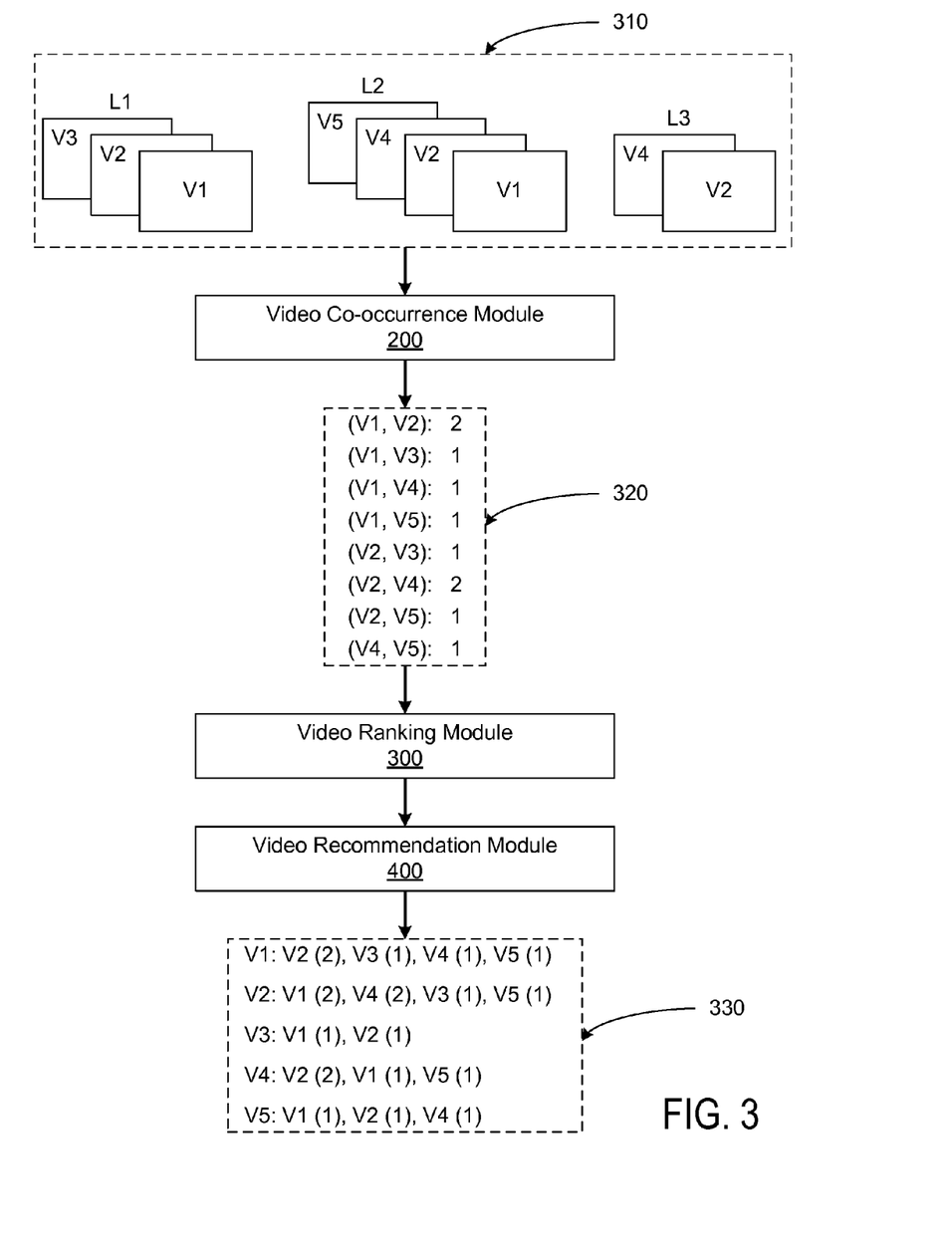
FIG. 3 is an example of video co-occurrence based video recommendation.

Taking the examples illustrated in FIG. 3, video 1 (i.e., V1) is on a first video playlist (i.e., L1), which includes videos V1, V2 and V3. V1 is also on another video playlist (i.e., L2), which includes videos V1, V2, V4 and V5. The video co-occurrence data of video V1 indicates that V1 groups together (i.e., co-occur) with V2 twice, with V3 once, with V4 once and with V5 once. The video co-occurrence data associated with V1 indicates that a user who watches V1 is more likely to watch V2 than to watch videos V3, V4 or V5.

Video co-occurrence data of a video can be based on other media channels in addition to video playlists. For example, videos can be played on a same user channel, blog post or web page. For the media channels other than video playlists, the video recommendation system 102 can apply the same or similar processing steps to generate video recommendations.

Figure 2:
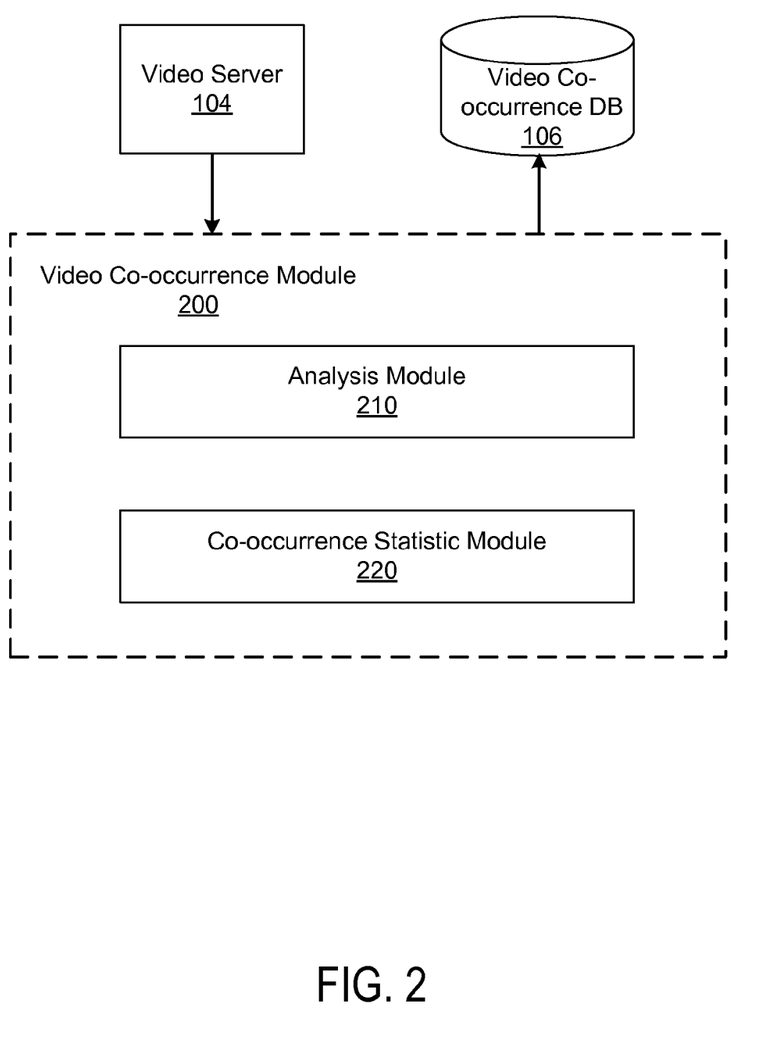
FIG. 2 is a block diagram of a video co-occurrence module of the video co-occurrence based video recommendation system illustrated in FIG. 1.

FIG. 2 is a block diagram of a video co-occurrence module 200 of the video co-occurrence based video recommendation system 102 illustrated in FIG. 1. In the embodiment illustrated in FIG. 2, the video co-occurrence module 200 includes an analysis module 210 and a co-occurrence statistic module 220. The analysis module 210 receives video playlists stored in the video server 104, extracts metadata associated with the video playlists and pairs each video on a video playlist with another video on the same playlist. The analysis module 210 generates video pairs for every two videos on a video playlist and similarly processes all the received video playlists.

Using the examples in FIG. 3, the analysis module 210 receives three video playlists: L1, L2 and L3. The playlist L1 has three videos V1, V2 and V3 and the videos in playlist L1 are played in the order of V1, V2 and V3. The playlist L2 has four videos V1, V2, V4 and V5 to be played in the order of V1, V2, V4 and V5. The playlist L3 has two videos V2 and V4 and V2 is played before V4. The analysis module 210 extracts the metadata associated with each video playlist L1, L2 and L3 to identify the videos in each playlist and pairs each video in the playlist with other videos on the same playlist. For example, for V1 on the video playlist L1, the analysis module 210 generates six video pairs: (V1, V2), (V1, V3), (V2, V3), (V2, V1), (V3, V2) and (V3, V1). In one embodiment, the analysis module 210 uses permutation on the videos in a video playlist to generate the video pairs. The analysis module 210 eliminates duplicate videos pairs. A video pair is considered as a duplicate of another video pair if the two video pairs contain the same videos. For example, video pair (V3, V2) is a duplicate of video pair (V2, V3). The analysis module generates three unique video pairs for the video playlist L1: (V1, V2), (V1, V3) and (V2, V3) after analysis.

Similarly, the analysis module 210 generates the video pairs for the video playlists L2 and L3. For example, the analysis module 210 generates six video pairs for L2: (V1, V2), (V1, V4), (V1, V5), (V2, V4), (V2, V5) and (V4, V5), and generates one video pair for L3: (V2, V4). The analysis module 210 communicates the video pairs of the analyzed video playlists to the co-occurrence statistic module 220 for further processing.

The co-occurrence statistic module 220 generates video co-occurrence data for each video analyzed by the analysis module 210. In one embodiment, the co-occurrence statistic of a video is the frequency of the video grouped with another video on one or more video playlists. Using the examples in FIG. 3, the co-occurrence statistics for video V1 includes the number of times (i.e., 2) of V1 and video V2 as a video pair on the video playlists L1, L2 and L3, the number of times (i.e., 1) of V1 and video V3 as a video pair, the number of times (i.e., 1) of V1 and video V4 as a video pair and number of times (i.e., 1) of V1 and video V5 as a video pair on the video playlists L1, L2 and L3. The co-occurrence statistic module 220 can represent the video co-occurrence statistics of analyzed videos as a matrix of video pairs (i.e., element 320 as shown in FIG. 3). The co-occurrence statistic module 220 stores the video co-occurrence statistics of the analyzed videos in the video co-occurrence database 106.

The co-occurrence statistic module 220 can generate secondary video co-occurrence data for each video analyzed by the analysis module 210. In one embodiment, the secondary video co-occurrence data is the number of hops between two videos linked by one or more other videos. A video that has fewer hops from a target video is more closely related to the target video than another video a larger number of "hops" away from the target video.

Taking video V3 in FIG. 3 as an example, video V3 is included only in video playlist L1 and V3 and video V5 are not together on any video playlists. However, V3 is on the same playlist as V1 (i.e., L1) and V1 is on the same playlist as V5 (i.e., L2). Through video V1, V3 and V5 are connected and the number of "hops" between V3 and V5 is 2 (e.g., V3→V1→V5). The secondary video co-occurrence data, such as number of "hops", can be used by the video ranking module 300 to rank videos related to a target video. For example, to rank two videos on two different video playlists for a target video, where one video is 1 hop away and the other is 2 hops away, the video ranking module 300 ranks the video 1 hop away from the target video higher than the other video which is 2 hops away from the target video.

The video ranking module 300 of the video recommendation system 102 in FIG. 1 ranks the videos stored in the video server 104. For each video selected from the videos in the video server 104 for video recommendations, the video ranking module 300 takes the selected video for recommendation as the target video and selects one or more other related videos from the video server 104. A video can be related to another video in a variety of ways, such as video content, sources of videos, uploading times of videos and being grouped together with other videos on one or more video playlists.

In one embodiment, the video ranking module 300 ranks the videos stored in the video server 104 based on the video co-occurrence statistics associated with the videos. The video recommendation system 102 selects co-occurrence videos of the target video. A co-occurrence video is a video that has been grouped together with the target video at least once on a video playlist. The video recommendation system 102 ranks the selected co-occurrence videos based on the video co-occurrence statistics associated with the target video and the selected co-occurrence videos. Each video after sorting has a ranking score representing a measure of likelihood of the video being watched by a user watching the target video. In real time video sharing environment, the video being played by a user becomes the target video.

Taking video V1 of FIG. 3 as an example, the video ranking module 300 selects V1 as the target video and identifies the videos associated with V1 based on the video co-occurrence statistics associated with V1: videos V2, V3, V4 and V5, because each of videos V2, V3, V4 and V5 has been grouped together with V1 for at least once among the video playlists L1, L2 and L3. The video ranking module 300 further sorts the related videos V2, V3, V4 and V5 based on the frequency of these videos grouped together with V1. As the result of sorting, the video ranking module 300 ranks the videos V2, V3, V4 and V5 with video V2 has higher ranking than videos V3, V4 and V5 because the video co-occurrence statistics associating V1 and V2 indicate that videos V1 and V2 have been grouped together twice.

Other embodiments of the video ranking module 300 consider one or more other factors in ranking the videos in the video server 104. For example, the video ranking module 300 may consider the distance of the videos in a video playlist and/or the distance between two videos on a playlist depends on the order of the two videos to be played. For example, the video playlist L2 of FIG. 3 has four videos V1, V2, V4 and V5. The distance between V1 and V2 is 1, the distance between V1 and V4 is 2 and the distance between V1 and V5 is 3. In one embodiment, the video ranking module 300 assigns a higher ranking score to a video having a shorter distance with a target video than a video having a longer distance with the target video. The video ranking module 300 can also use both the video co-occurrence statistics associated with a target video together with distance information of the target video to rank the videos associated with the target video. For example, although video V1 has been grouped together once with video V3 (in video playlist L1) and with video V5 (in video playlist L2), the distance between V1 and V3 is 2, but the distance between V1 and V5 is 3. The video ranking module 300 assigns video V3 a higher ranking score than for video V5.

Another factor that can be used by the video ranking module 300 is the uploading time of the videos associated with a target video. Videos uploaded around same time are more likely to be watched together by users. The video ranking module 300 can extract the video uploading time from a target video and sort the videos associated with the target video based on the video uploading times. For example, video V1 in FIG. 3 has same frequency (i.e., 1) of being grouped with video V3 in video playlist L1 and with video V4 in video playlist L2. If the video uploading time for V3 is closer to the uploading time of V1 than the uploading time of V2 with respect to V1, the video ranking module 300 ranks V3 higher than V4.

The video ranking module 300 can further consider other factors, such as the video quality of each video associated with a target video and the popularity of the videos. For example, a video shot by professional for "National Geography" has a higher ranking score than a similar video shot by an amateur. A video shared by millions of users has a higher ranking score than a video shared within a small group of friends. To consider multiple factors for ranking the videos associated with a target video, the video ranking module 300 can assign weight to each ranking factors and computes an aggregated ranking score for each video associated with the target video. The weight assigned to each ranking factor is a configurable design choice, e.g., based on user information describing user channel in the video sharing environment, user hobbies, etc.

In another embodiment, the video ranking module 300 ranks the video playlists themselves. The video ranking module 300 generates a ranking score for a video playlist based on ranking scores of each individual video in the video playlist. The video ranking module 300 can further considers characteristics associated with a video playlist, such as the reputation of the creator of the video playlist, the number of submissions to the user channel owned by the creator of the video playlist. The video ranking module 300 communicates with the video recommendation module 400 regarding the rankings of the videos in the video playlists and rankings of the video playlists themselves.

The video recommendation module 400 of the video recommendation system 102 in FIG. 1 receives the rankings of the videos in the video playlists and video playlists themselves and generates video recommendations for each video on a video playlist. In one embodiment, the video recommendation module 400 generates a set of videos as video recommendations for a target video ordered based on the rankings of the videos. Taking video V1 in FIG. 3 as an example, the video recommendation module 400 generates a set of videos: V2, V3, V4 and V5, as the video recommendations with V2 as the most recommended video among the video recommendation candidates V2, V3, V4 and V5.

The video recommendation module 400 can augment the ranking of an individual video in a video playlist with the ranking of the video playlist containing the video. For example, the ranking of a video on a video playlist with high ranking score for the playlist can be scaled up than a video on a video playlist with lower ranking score. The video recommendation module 400 can apply a scaling factor between zero and one to the rankings of videos on a video playlist based on the ranking score of the video playlist.

FIG. 3 is an example of operations of video co-occurrence based video recommendation. The video co-occurrence module 200 receives three video playlists 310. The video playlists L1, L2 and L3 can be generated and uploaded to the video sharing service 100 by users, or generated by an entity of the video sharing service 100 (e.g., the video recommendation system 102). The video playlist L1 has three videos V1, V2 and V3, the video playlist L2 has four videos V1, V2, V4 and V4 and video playlist L3 has two videos V2 and V4. The video co-occurrence module 220 analyzes the videos and pairs the videos in the video playlists as described above. The processing result from the video co-occurrence module 220 is a matrix 320 of video pairs and frequency of the video pairs among the video playlists L1, L2 and L3. Each video has associated video co-occurrence statistics from the analysis.

The video ranking module 300 receives the video pairs and the frequency data from the video co-occurrence module 200 and rank the videos based on the video co-occurrence statistics associated with the videos. Video ranking module 300 can also rank the video playlists based on the video co-occurrence statistics of the videos contained in the video playlists as described above. Video ranking module 300 can augment the ranking of an individual videos based on the ranking of the video playlist containing the video. The video ranking module 300 communicates with the video recommendation module 400 for further processing the video co-occurrence statistics.

The video recommendation module 400 generates recommendations (e.g., video recommendations 330 in FIG. 3) for each video on the videos playlists L1, L2 and L3 based on the rankings of the videos and one or more other factors (e.g., distance of videos, uploading time of videos). In one embodiment, each video has one or more other videos related to it and the relation between a video and its video recommendations is based on the video co-occurrence statistics associated with the video and the video recommendations.

The recommendation update module 500 of the video recommendation system 102 in FIG. 1 updates the video recommendations shown to a user watching a target video. In one embodiment, the recommendation update module 500 periodically updates the video recommendations. The recommendation update module 500 may also update the video recommendation associated with a target video in real time responsive to the launching of the target video. The updates performed by the recommendation update module 500 include inserting new video recommendations into a current list of video recommendations for a target video, replacing a current video recommendation with a new video recommendation and adjusting the order of the video recommendations based on the ranking scores of the video recommendations.

To insert a new video recommendation or replace a current video recommendation with a new video recommendation, the recommendation update module 500 compares the ranking of the new video recommendation with the current video recommendations. In one embodiment, the video recommendation update module 500 assigns different weight to the rankings of the video recommendations generated by different ranking criteria and threshold value for selecting among two video recommendations under different ranking schemes. For example, comparing a video recommendation generated based on co-watch data with a video recommendation based on video co-occurrence statistics, the recommendation update module 500 assigns bigger weight to the video recommendation based on co-watch data than to the video recommendation based on video co-occurrence statistics. Among a video that has been co-watched 10 times with a target a video and a video that has been grouped together 50 times with the target video, the recommendation update module 500 selects the video grouped together 50 times with the target video as the video recommendation for the target video.

Figure 4A:
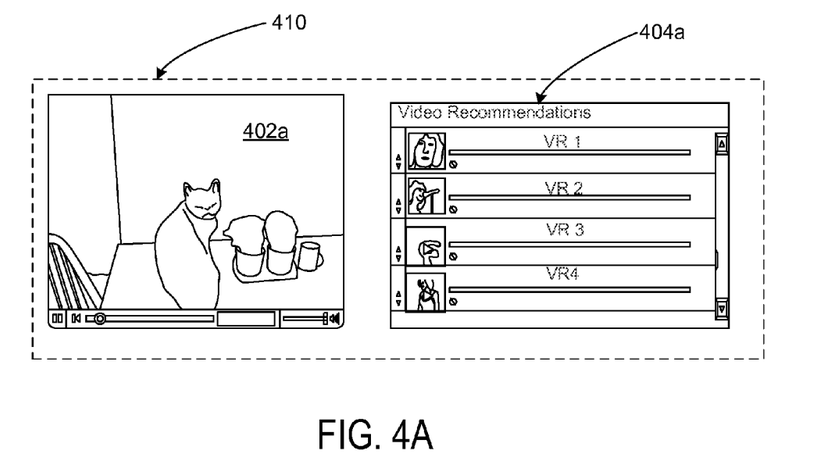
FIG. 4A is an example interface of displaying a target video being watched and a group of video recommendations before video co-occurrence based video recommendation update.

FIG. 4A is an example interface 410 of displaying a target video 402a being watched by a user and a group of current video recommendations 404a before video recommendation update by the recommendation update module 500. The example interface 410 has an area for displaying the target video 402a and an area for displaying video recommendations 404a. In the example illustrated in FIG. 4A, each video recommendation 402a has a thumbnail image of the video recommendation and each video recommendation has a ranking score with respect to the target video 402a. The video recommendations are displayed in an order according to their ranking scores. For example, first video recommendation VR1 as the most recommended video for the target video 402a has the highest ranking, and the fourth video recommendation VR4 as the least recommended video has the lowest ranking score among the 4 video recommendations VR1, VR2, VR3 and VR4. The current video recommendations 404a can be generated based on co-watch data associated with the video recommendations.

Figure 4B:
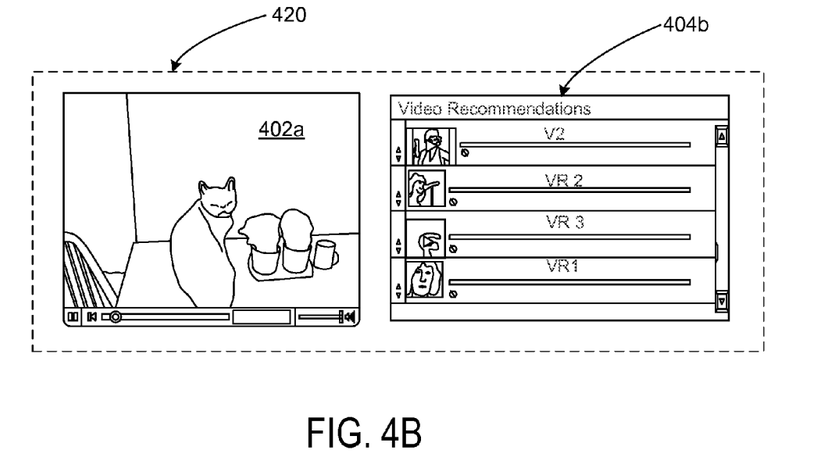
FIG. 4B is an example interface of displaying a target video being watched and a group of video recommendations after video co-occurrence based video recommendation update.

FIG. 4B is an example interface 420 of displaying a target video 402a being watched by a user and a group of video recommendations 404b after video recommendation update by the recommendation update module 500. Comparing with the video recommendations 404a before the update, the video recommendations 404b after the update contains a new video recommendation V2 based on the video co-occurrence statistics of the targeting video 402a. The recommendation update module 500 also deletes the previously recommended video VR4 from the video recommendations 404b after the update.

In one embodiment, the total number of video recommendations is limited by the dimension of the area for displaying video recommendations. In response to the display area for video recommendations not being able to display all the video recommendations, the recommendation update module 500 selects a number of video recommendations based on their ranking scores. The recommendation update module 500 also updates the order of video recommendations based on their ranking scores. For example, video recommendation VR1 after the update becomes the fourth video recommendation for the targeting video 402a.

Figure 5:
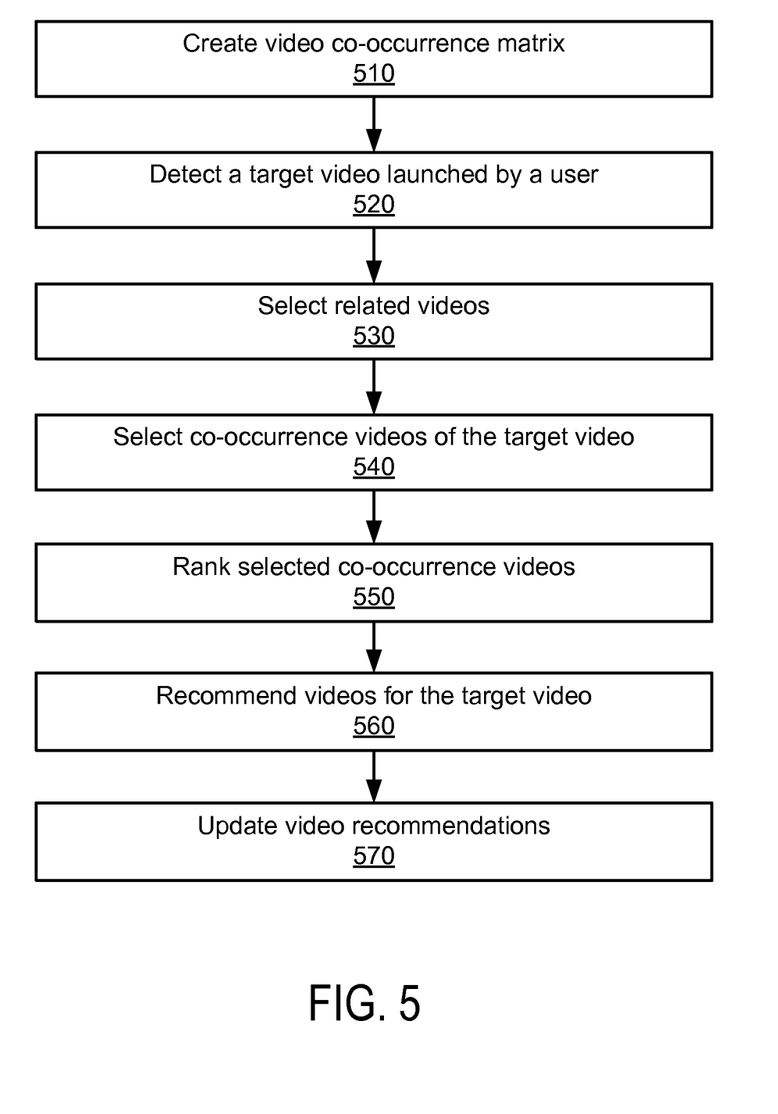
FIG. 5 is a flow chart of video co-occurrence based video recommendation.

FIG. 5 is a flow chart of real time video co-occurrence based video recommendation for a target video in real time. Initially, the video recommendation system 102 creates 510 a video co-occurrence matrix (e.g., the video recommendations 330 in FIG. 3). Each video in the video co-occurrence matrix has associated video co-occurrence data (e.g., frequency of the video grouped together with another video on one or more videos lists). The video recommendation system 102 detects 520 a target video by a user. For example, responsive to a user playing a YouTube video, the video recommendation system 102 selects 530 one or more videos related to the target video. In one embodiment, the video recommendation system 102 selects 540 co-occurrence videos of the target video. A co-occurrence video is a video that has been grouped together with the target video at least once on a video list.

The video recommendation system 102 ranks 550 the selected videos based on the video co-occurrence statistics associated with the target video and the selected co-occurrence videos. The video recommendation system 102 recommends 560 videos for the target video based on the ranking of the selected co-occurrence videos. The video recommendation system 102 updates 570 video recommendations associated with the target video periodically or in real time.

Taking real time updating as an example, where a target video has a list of current video recommendations (e.g., FIG. 4A), the video recommendation system 103 compares the rankings associated with the newly generated video recommendations and the current video recommendations. The video recommendation system 102 inserts a new video recommendation into the current list of video recommendations, or replaces a current video recommendation with a new video recommendation (e.g., FIG. 4B). The video recommendation system 102 displays an updated list of video recommendations for the target video.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of a method. It should be noted that the process steps and instructions of the invention can be embodied in software, firmware or hardware, and when embodied in software, can be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention.

We claim:

1. A computer method for generating video recommendations for a target video in a video sharing environment, comprising:
    identifying a plurality of video playlists associated with the target video, each of the plurality of the video playlists containing the target video and a plurality of other videos;
    generating video co-occurrence data for the target video, wherein generating video co-occurrence data comprises:
        for each identified video playlist, generating one or more video pairs, each video pair containing the target video and another video on the video playlist; and
        for each video pair, computing the frequency of the video pair on the plurality of the video playlists;
    generating a ranking score for each of the other videos on the plurality of the video playlists, a ranking score of a video on a video playlist representing a measurement of likelihood of the video being viewed by a user viewing the target video;
    ordering the other videos based on the ranking scores of the other videos and the computed frequency with which each of the other videos are paired with the target video on the video playlists; and
    generating one or more video recommendations for the target video based on the ordering of the other videos.

2. The method of claim 1, wherein a video playlist is described by metadata associated with the video playlist, the metadata identifying one or more videos on the video playlist and an order of the videos to be played.

3. The method of claim 1 wherein one or more of the plurality of the video playlists were created by users.

4. The method of claim 1, wherein the video co-occurrence data describes a plurality of associations between the target video and other videos on the plurality of the video playlists, and the plurality of the associations between the target video and other videos on the plurality of the video playlists are determined based on at least one of:
    video content of the target video and other videos;
    sources of the target video and other videos;
    uploading time of the target video and other videos;
    video quality of the target video and other videos; and
    frequency of the target video and other videos being on the same video playlists.

5. The method of claim 1, further comprising:
    generating an aggregated ranking score for each of the other videos on the plurality of the video playlists according to a plurality of weighted ranking factors; and
    ordering the other videos on the plurality of the video playlists based on aggregated ranking scores of the other videos and the computed frequency with which each of the other videos are paired with the target video on the video playlists.

6. The method of claim 1, further comprising ordering the other videos based on a distance between the target video and each of the other videos, the distance between the target video and another video determined based on an order of the target video and the another video to be played.

7. The method of claim 1, further comprising:
    generating secondary video co-occurrence data of the target video, the secondary video co-occurrence data of the target video indicating a number of hops between the target video and another video on a video playlist, the number of hops determined based on an order of the target video and the another video to be played.

8. The method of claim 7, wherein a video having a fewer hops from the target video is more closely related to the target video than another video having a larger number of hops.

9. A non-transitory computer-readable storage medium storing executable computer program instructions for generating video recommendations for a target video in a video sharing environment, the computer program instructions comprising instructions for:
    identifying a plurality of video playlists associated with the target video, each of the plurality of the video playlists containing the target video and a plurality of other videos;
    generating video co-occurrence data for the target video, wherein generating video co-occurrence data comprises:
        for each identified video playlist, generating one or more video pairs, each video pair containing the target video and another video on the video playlist; and
        for each video pair, computing the frequency of the video pair on the plurality of the video playlists;
    generating a ranking score for each of the other videos on the plurality of the video playlists, a ranking score of a video on a video playlist representing a measurement of likelihood of the video being viewed by a user viewing the target video;
    ordering the other videos based on the ranking scores of the other videos and the computed frequency with which each of the other videos are paired with the target video on the video playlists; and
    generating one or more video recommendations for the target video based on the ordering of the other videos.

10. The computer-readable storage medium of claim 9, wherein a video playlist is described by metadata associated with the video playlist, the metadata identifying one or more videos on the video playlist and an order of the videos to be played.

11. The computer-readable storage medium of claim 9, wherein one or more of the plurality of the video playlists were created by users.

12. The computer-readable storage medium of claim 9, wherein the video co-occurrence data describes a plurality of associations between the target video and other videos on the plurality of the video playlists, and the plurality of the associations between the target video and other videos on the plurality of the video playlists are determined based on at least one of:

video content of the target video and other videos;
  sources of the target video and other videos;
  uploading time of the target video and other videos;
  video quality of the target video and other videos; and
  frequency of the target video and other videos being on the same video playlists.

13. The computer-readable storage medium of claim 9, further comprising computer program instructions for: generating an aggregated ranking score for each of the other videos on the plurality of the video playlists according to a plurality of weighted ranking factors; and ordering the other videos on the plurality of the video playlists based on aggregated ranking scores of the other videos and the computed frequency with which each of the other videos are paired with the target video on the video playlists.

14. The computer-readable storage medium of claim 9, further comprising computer program instructions for ordering the other videos based on a distance between the target video and each of the other videos, the distance between the target video and another video determined based on an order of the target video and the another video to be played.

15. The computer-readable storage medium of claim 9, further comprising computer program instructions for:

generating secondary video co-occurrence data the target video, the secondary video co-occurrence data of the target video indicating a number of hops between the target video and another video on a video playlist, the number of hops determined based on an order of the target video and the another video to be played.

16. The computer-readable storage medium of claim 15, wherein a video having a fewer hops from the target video is more closely related to the target video than another video having a larger number of hops.

* * * * *